US008228877B2

(12) United States Patent
Jones

(10) Patent No.: US 8,228,877 B2
(45) Date of Patent: Jul. 24, 2012

(54) MULTI-USER DETECTOR AND METHOD FOR USE IN A COMMUNICATION SYSTEM

(75) Inventor: Alan Edward Jones, Wiltshire (GB)

(73) Assignee: Nvidia Corporation, Santa Clara, CA (US)

( * ) Notice: Subject to any disclaimer, the term of this patent is extended or adjusted under 35 U.S.C. 154(b) by 918 days.

(21) Appl. No.: 11/596,795

(22) PCT Filed: May 10, 2005

(86) PCT No.: PCT/EP2005/052116
§ 371 (c)(1),
(2), (4) Date: Nov. 4, 2008

(87) PCT Pub. No.: WO2005/114859
PCT Pub. Date: Dec. 1, 2005

(65) Prior Publication Data
US 2009/0054060 A1  Feb. 26, 2009

(30) Foreign Application Priority Data

May 20, 2004 (GB) .................................. 0411242.1

(51) Int. Cl.
H04B 7/216 (2006.01)
H04B 1/00 (2006.01)
H04W 4/00 (2009.01)
(52) U.S. Cl. ........ 370/335; 370/328; 370/330; 370/342; 455/450; 455/63.1; 455/114.2; 455/296; 455/447; 455/513
(58) Field of Classification Search .......... 455/450–453, 455/63.1–63.2, 114.2, 296, 447, 513; 370/329, 370/330, 342
See application file for complete search history.

(56) References Cited

U.S. PATENT DOCUMENTS
2003/0003906 A1* 1/2003 Demers et al. ................ 455/424

FOREIGN PATENT DOCUMENTS
FR 2802049 12/1999
FR 2 802 049 6/2001
(Continued)

OTHER PUBLICATIONS

Extended European Search Report dated Jan. 18, 2011 from European Application No. 1018562.3-1525.
(Continued)

Primary Examiner — Lester Kincaid
Assistant Examiner — Daniel Lai

(57) ABSTRACT

A multi-user detector (200) and method (300) for use in a cellular CDMA system (100) based on: estimating (210) spare code resource available in a first cell of the system; selecting (220) at least a second cell neighbouring the first cell; selecting (230) from codes associated with the second cell at least one additional code; and performing (240) multi-user detection processing in the first cell with the at least one additional code. On the downlink, codes from other users in the same cell may be treated with the same level of priority as those of users from neighbour cells, codes allocated to the UE having the highest priority; on the uplink, codes of all users in the same cell may have the same priority which is higher than that of neighbour cell users. This provides the advantage(s) that multi-user detector capacity arising from operating under high interference conditions is employed to accommodate users from neighbour cells, with the result that both intracell and intercell interference may be mitigated.

25 Claims, 3 Drawing Sheets

FOREIGN PATENT DOCUMENTS

| | | |
|---|---|---|
| WO | WO-9512259 | 5/1995 |
| WO | WO 01/58041 | 8/2001 |
| WO | WO-0158041 | 8/2001 |

OTHER PUBLICATIONS

Shimon Moshavi, Bellcore; Multi-User Detection for DS-CDMA Communications; XP 000694489; Topics in Personal Communications, IEEE Communications Magazine, 13 pages, Oct. 1996.

Moshavi, S. (1996). "Multi-User Detection for DS-CDMA Communications," IEEE Communications Magazine, IEEE Service Center, Piscataway, N.J., US, 34(10):124-136.

GB Search Report mailed Nov. 30, 2004, for GB Application No. GB0411242.1, filed May 20, 2004, three pages.

International Search Report and Written Opinion of the International Searching Authority mailed on Aug. 12, 2005, for PCT/EP2005/052116, filed on May 10, 2005, 12 pages.

Extended European Search Report Dated Feb. 18, 2011 from European Application No. 10184536.0-1524.

* cited by examiner

MULTI-USER DETECTOR AND METHOD FOR USE IN A COMMUNICATION SYSTEM

CROSS-REFERENCE TO RELATED APPLICATIONS

This application is a U.S. national phase application of International Application No. PCT/EP2005/052116, filed May 10, 2005, which claims priority to United Kingdom Application No. 0411242.1, filed May 20, 2004, the contents of which are hereby incorporated by reference into the present disclosure in their entirety.

FIELD OF THE INVENTION

This invention relates to multi-user detectors and particularly, though not exclusively, to multi-user detectors for use in UTRA (UMTS—Universal Mobile Telecommunication System—Terrestrial Radio Access) communication systems operating in TDD (Time Division Duplex) mode.

BACKGROUND OF THE INVENTION

A multi-user detector, usable in such a CDMA (Code Division Multiple Access) system, can typically mitigate both intracell and intercell interference. The multi-user detector is dimensioned against the maximum number of codes needed for correct operation; this number is generally derived from the intracell interference case. In a CDMA system, the allocation of codes within the cell is a function of the intercell interference; under high interference conditions the number of codes is typically reduced, and under low interference conditions the number of codes is typically increased. The multi-user detector is typically dimensioned for the low interference case, and therefore under high interference conditions the multi-user detector capacity is under utilized.

Hence, an improved multi user detector would be advantageous and in particular a multi-user detector allowing for increased flexibility, improved performance, improved detection, increased interference suppression and/or an increased usage of the multi-user detector capacity would be advantageous.

STATEMENT OF INVENTION

Accordingly, the Invention seeks to preferably mitigate, alleviate or eliminate one or more of the above mentioned disadvantages singly or in any combination.

In accordance with a first aspect of the present invention there is provided a multi-user detector for use in a CDMA communication system as claimed in claim 1.

In accordance with a second aspect of the present invention there is provided a multi-user detection method for use in a CDMA communication system as claimed in claim 24.

Briefly stated, rather than leave spare multi-user detector capacity arising from operating under high interference conditions under-utilized as heretofore, the present invention may in some embodiments employ this spare capacity to include signals from neighbour cells in the detection, allowing both intracell and intercell interference to be mitigated. The available multi-user detector resource may effectively be utilised to match the current conditions and requirements resulting in improved communication, increased flexibility, increased interference suppression and/or improved performance of the cellular communication system as a whole. The technique is equally applicable to downlink and uplink operation.

BRIEF DESCRIPTION OF THE DRAWING(S)

One multi-user detector and method for use in a 3GPP ($3^{rd}$ Generation Partnership Project) UMTS (Universal Mobile Telecommunication System) Terrestrial Radio Access Network (UTRAN) communication system incorporating some embodiments of the present invention will now be described, by way of example only, with reference to the accompanying drawing(s), in which.

DESCRIPTION OF PREFERRED EMBODIMENT(S)

The following preferred embodiment of the present invention will be described in the context of a UMTS Radio Access Network (UTRAN) system operating in TDD mode. However, it will be appreciated that the invention is not limited to this specific application but may be used in many other communication systems.

Figure 1:
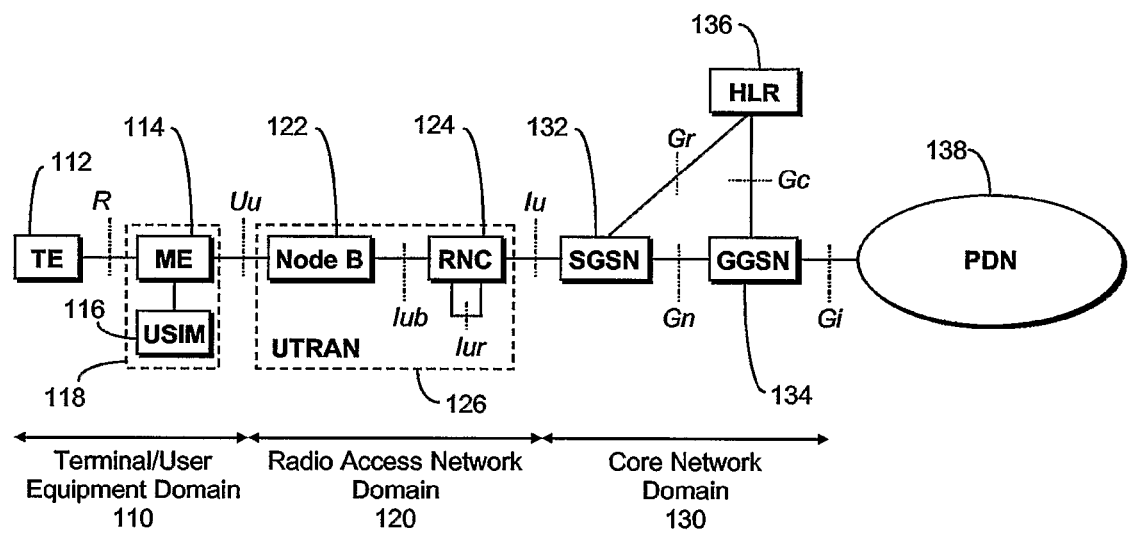
FIG. 1 shows a block schematic diagram illustrating a TDD 3GPP radio communication system in which some embodiments of the present invention may be used.

Referring firstly to FIG. 1, a typical, standard UMTS Radio Access Network (UTRAN) system 100 is conveniently considered as comprising: a terminal/user equipment domain 110; a UMTS Terrestrial Radio Access Network domain 120; and a Core Network domain 130.

In the terminal/user equipment domain 110, terminal equipment (TE) 112 is connected to mobile equipment (ME) 114 via the wired or wireless R interface. The ME 114 is also connected to a user service identity module (USIM) 116; the ME 114 and the USIM 116 together are considered as a user equipment (UE) or mobile station 118. The UE 118 communicates data with a Node B (base station) 122 in the radio access network domain 120 via the wireless Uu interface. Within the radio access network domain 120, the Node B 122 communicates with an radio network controller (RNC) 124 via the Iub interface. The RNC 124 communicates with other RNC's (not shown) via the Iur interface. The Node B 122 and the RNC 124 together form the UTRAN 126. The RNC 124 communicates with a serving GPRS service node (SGSN) 132 in the core network domain 130 via the Iu interface. Within the core network domain 130, the SGSN 132 communicates with a gateway GPRS support node (GGSN) 134 via the Gn interface; the SGSN 132 and the GGSN 134 communicate with a home location register (HLR) server 136 via the Gr interface and the GC interface respectively. The GGSN 134 communicates with public data network 138 via the Gi interface.

Thus, the elements RNC 124, SGSN 132 and GGSN 134 are conventionally provided as discrete and separate units (on their own respective software/hardware platforms) divided across the radio access network domain 120 and the core network domain 130, as shown in FIG. 1.

The RNC 124 is the UTRAN element responsible for the control and allocation of resources for numerous Node B's 122; typically 50 to 100 Node B's may be controlled by one RNC. The RNC also provides reliable delivery of user traffic over the air interfaces. RNC's communicate with each other (via the Iur interface) to support handover.

The SGSN 132 is the UMTS Core Network element responsible for Session Control and interface to the HLR. The SGSN keeps track of the location of an individual UE and performs security functions and access control. The SGSN is a large centralised controller for many RNCs.

The GGSN 134 is the UMTS Core Network element responsible for concentrating and tunnelling user data within the core packet network to the ultimate destination (e.g., internet service provider—ISP).

Such a UTRAN system and its operation are described more fully in the 3GPP technical specification documents 3GPP TS 25.401, 3GPP TS 23.060, and related documents, available from the 3GPP website at www.3gpp.org, and need not be described in more detail herein.

The detector used for receiving signals in such a CDMA system (e.g., in UE 118 or Node B 122) is commonly a multi-user detector.

In such a system, a Node B (122) can support one or more cells and a network consists of multiple Node Bs and hence multiple cells. Let the number of cells in the network be defined by M, and suppose each cell has $K^{(m)}$ codes, where $m=1 \wedge M$.

Suppose the UE is connected to cell m; then, for mitigating intracell interference only, the receiving side estimates the $K^{(m)}$ codes used in cell m and considers the intercell interference from the remaining M−1 cells as part of the overall noise term. The maximum number of codes the multi-user detector ever has to cope with for the intracell interference case on both uplink and downlink is denoted by $K_{max}^{(m)}$. The multi-user detector is usually dimensioned to support $K_{max}^{(m)}$ codes, for 3GPP TD-CDMA this is $K_{max}^{(m)}=16$.

As mentioned above, the allocation of codes within the cell is a function of the intercell interference; under high interference conditions the number of codes is typically reduced, and under low interference conditions the number of codes is typically increased.

As will be explained below, rather than leave the spare multi-user detector capacity arising from operating under high interference conditions under-utilized as heretofore, in this exemplary embodiment of the present invention spare capacity is employed to accommodate users from neighbour cells. The result is that both intracell and intercell interference may be mitigated resulting in improved performance.

In the specific embodiment of the present invention, the multi-user detector spare resource is re-allocated for the purpose of mitigating intercell interference. The reallocation means that codes from surrounding neighbour cells are also simultaneously detected by the receiver and as such are no longer considered to be part of the overall noise term. Thus, by including the codes from the surrounding cells in the multi-user detection, the interference to the wanted signal which originate from these neighbour cells may be effectively reduced and mitigated.

The multi-user detector always attempts to run at the maximum capacity $K_{max}^{(m)}$. Since the maximum code capacity of the multi-user detector is limited by $K_{max}^{(m)}$ the optimum set of codes should be selected to maximise performance. In the specific exemplary embodiment, two sets of codes, S1 and S2, are defined, where N1 and N2 are the number of codes in S1 and S2 respectively and $N1+N2 \leq K_{max}^{(m)}$. When selecting codes for inclusion in the multi-user detector process, codes belonging to the set S1 have higher priority than those codes belonging to the set S2. In the specific example, all codes within each set furthermore have equal priority. Additionally, in the example, codes belonging to S1 are guaranteed inclusion in the detection process.

For example, for the uplink case, power control ensures that codes from the same cell are received at nominally the same power level. In this instance all intracell codes may belong to S1 and all intercell codes may belong to S2.

For the downlink case, different UEs are power controlled by different amounts. Some intracell codes arriving at the UE receiver may be at substantially different power levels relative to those codes allocated to the UE of interest, in fact, some intercell codes may be at substantially higher power levels than some of the intracell codes. In this instance, all codes allocated to the UE of interest may be included in S1 and all remaining intracell and intercell codes may be included in S2.

It will be understood, that the above description relates to a specific example, and that assigning codes to sets is highly flexible and may depend on the particular situation or application. Moroever, it will also be understood that the number of code sets can be increased and the levels of priority assigned to each set can be optimised for performance.

Figure 2:
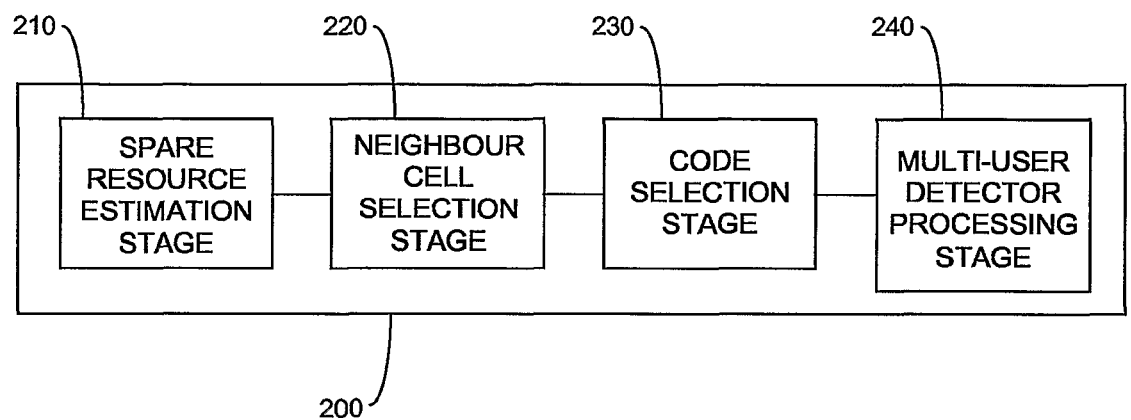
FIG. 2 shows a block schematic diagram illustrating a multi-user detector, utilised in the system of FIG. 1, incorporating some embodiments of the present invention.

Referring now to FIG. 2, a multi-user detector 200 which may be implemented in the system 100 of FIG. 1 (in the receiver section of a UE 118 and/or a Node B base station 122) includes three stages: a spare resource estimation stage 210, a neighbour cell selection stage 220, a code selection stage 230, and a multi-user detector processing stage 240 (known per se).

Figure 3:
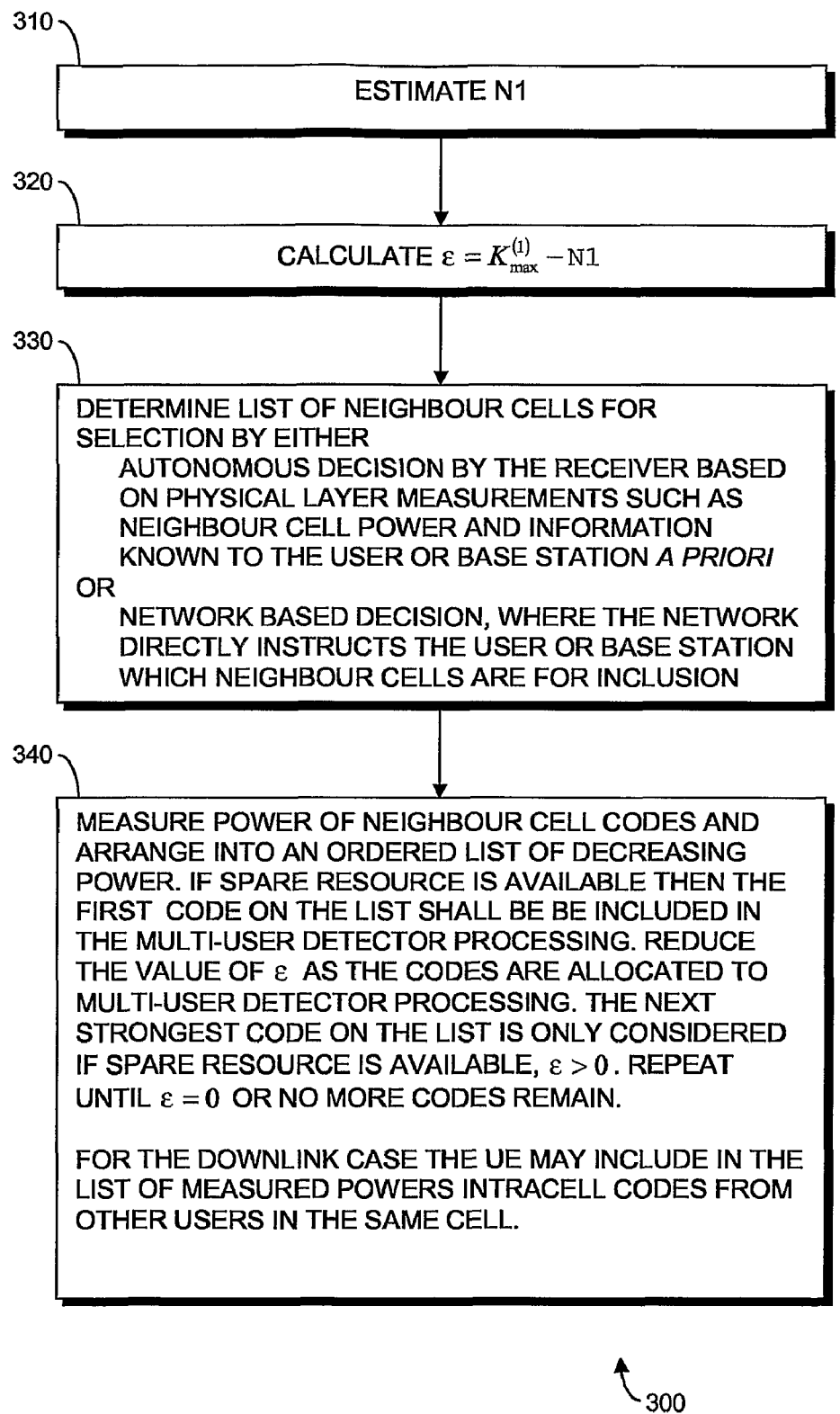
FIG. 3 shows a block schematic flow diagram illustrating a method, employed in the detector of FIG. 2, incorporating some embodiments of the present invention.

Referring now also to FIG. 3, the following description explains how the receiver estimates the spare resource.

Estimating Spare Resource

In the specific embodiment, N1 defines the number of intracell codes for the uplink case, and for the downlink case N1 is the number of codes allocated to the UE of interest. Thus, N1 denotes the number of codes that will be included in S1. It will be understood that the approach is very general and can be applied to any communication system that requires multi-user detection for mitigating interference.

There are different methods for estimating N1 (step 310), including;

1) Direct signalling method. Here the receiver is informed directly using higher layer messaging.
2) Estimation using measurements. Here the receiver employs measurements, such as measurements of code power to determine N. For example, the receiver may perform a correlation of the received signal with the possible codes and if the correlation results in a sufficiently high signal it is assumed that this code is present.
3) Hybrid method using methods 1) and 2). Here indirect signalling is employed using midamble (or pilot) sequences and a predefined mapping of codes to midamble sequences. For example, in 3GPP the choice of midamble sequences is selected to provide an indication of the number of codes used. The receiver may thus correlate the received midamble with possible midamble sequences and identify the midamble as the midamble sequence resulting in the highest correlation value. The number of codes may then be determined as the number associated with this specific midamble.

The spare resource in the multi-user detector is defined using the following formula (step 320):

$$\epsilon = K_{max}^{(m)} - N1 \tag{1}$$

Thus $\epsilon$ indicates the number of codes which have not been allocated to the N1 codes of S1.

In the following description, the method by which the receiver determines which neighbour cells to include in the multi-user detector process (step 330) is explained.

Neighbour Cell Selection

When $\epsilon$ has been determined, the spare multi-user detector capacity is assigned for mitigating interference from other cells. Thus the Fcodes are selected as codes used in neighbour cells. The methods for determining which codes and neighbour cells to include can for example be based on the following:

1) An autonomous decision by the receiver based on physical layer measurements, such as neighbour cell power and information known to the receiver a priori. Thus, the receiver itself may determine which neighbour cells to include in the multi-user detection. For example, the receiver may measure the signal strength of neighbour cells included in a neighbour list and may select the neighbour cells being received with the highest signal values.
2) A network based decision, where the network directly instructs the receiver which neighbour cells to include. For example, the network may determine the cells likely to be the strongest interferers from a topographical evaluation and may inform the receiver of these cells.

A means and a method for 1) have already been described in patent application GB0405166.0, the subject matter of which is hereby incorporated herein by reference.

Either by way of 1) or 2), it is assumed that the receiver may have at its disposal a list of neighbour cells for consideration. In the context of this description the exact means by which this list is arrived at is incidental to the invention and need not be discussed further herein. It will be appreciated that in the preferred embodiment for the downlink case, codes from other users in the same cell belong to set S2 as do the codes from users in neighbour cells, and that as such the intracell identification is included in the neighbour list.

In the following description, the method by which the receiver determines codes for multi-user detector processing (step 340) is explained.

Code Selection

As defined by equation (1), the multi-user detector cannot include all non-zero interfering codes as the amount of spare resource $\epsilon$ is ultimately limited by the value $K_{max}^{(m)}$. Instead, the receiver has to select a subset of codes from the set of codes S2.

It may be noted that in another embodiment the maximum code capacity of the multi-user detector might be set greater than the maximum number of codes for the intracell case. This may for example allow intercell interference mitigation even if all codes are used in the current cell.

The measured power of the codes belonging to the set S2 are arranged into an ordered list of decreasing power, i.e. the first element in the list is the code with the strongest power. If spare resource in the multi-user detector is available then the first code on the ordered list shall be included in the multi-user detector processing. When considering codes belonging to the set S2, only those with non-zero power are allocated to multi-user detector processing.

When a code of the set S2 is allocated to the multi-user detector from the ordered list, the number of remaining codes to allocate is decremented. As we move through the ordered list of powers, the value of $\epsilon$ is thus reduced as the codes are allocated to multi-user detector processing. The next strongest code on the list is only considered if spare resource is available, $\epsilon > 0$. This process is repeated until $\epsilon = 0$ or there are no more codes to remove from the set S2.

The power of the codes belonging to the set S2 could also be midamble power, or in the context of UMTS FDD (Frequency Division Duplex) or CDMA2000 pilot power. In the preferred embodiment midamble power is employed to determine the codes to be included in the multi-user detector processing. It will be appreciated that although the term midamble is used in this description, any suitable training sequence(s) such as a postamble or a preamble may be equally applicable.

It will be also be understood that the above technique is also suitable for supporting reception of signals which are substantially similar, where the signals are transmitted from a plurality of base stations.

It will be appreciated that the multi-user detector and method described above may be carried out in software running on processors (not shown) in the UE and/or Node B, and that the software may be provided as a computer program element carried on any suitable data carrier (also not shown) such as a magnetic or optical computer disc.

It will be also be appreciated that the multi-user detector and method described above may alternatively be implemented in hardware, for example in the form of an integrated circuit (not shown) such as an FPGA (Field Programmable Gate Array) or ASIC (Application Specific Integrated Circuit).

In conclusion, it will be understood that the multi-user detector and method described above provides the advantage(s) that spare multi-user detector capacity arising from operating under certain channel conditions is employed to accommodate users from neighbour cells, with the result that both intracell and intercell interference may be mitigated. It will also be understood that the multi-user detector capacity may be increased beyond the code limitation of the intracell case.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

The invention claimed is:

1. A wireless communication unit comprising a multi-user detector for use in a Code Division Multiple Access (CDMA) cellular communication system, the multi-user detector comprising:
    a spare resource estimation processor configured to estimate spare code resource available in a first cell of the CDMA cellular communication system;
    a neighbor cell selection processor configured to select at least a second cell neighbouring the first cell;
    a code selection processor configured to select from codes associated with the second cell at least one additional code;
    a multi-user detector processor configured to perform multi-user detection processing in the first cell with the at least one additional code;
    wherein the code selection processor is further configured to:
        treat codes associated with the first cell with a same priority as the at least one additional code associated with the second cell, and
        treat at least a first code associated with a first mobile station with a higher priority.

2. The wireless communication unit of claim 1, wherein the multi-user detector is further configured to estimate allocated code resource in the first cell from predetermined parts of signals received in the first cell.

3. The wireless communication unit of claim 2 wherein the predetermined parts comprise midamble sequences.

4. The wireless communication unit of claim 1 wherein the multi-user detector is further configured to autonomously decide the at least a second cell neighbouring the first cell.

5. The wireless communication unit claim 4 wherein the multi-user detector is further configured to autonomously decide on the basis of at least one of A-B:
    A physical layer measurements,
    B information known a priori.

6. The wireless communication unit of claim 5 wherein the physical layer measurements comprise neighbour cell power measurements.

7. The wireless communication unit claim 1 wherein the multi-user detector is further configured to receive from the network instruction for selecting the at least a second cell neighbouring the first cell.

8. The wireless communication unit of claim 1 wherein the multi-user detector is further configured to form a first set of codes and a second set of codes and is capable of being arranged to select codes for the multi-user detector processing logic with a higher priority for codes of the first set of codes than for codes of the second set of codes.

9. The wireless communication unit of claim 8 wherein the multi-user detector is further configured to select all codes from the first set for the multi-user detector processing logic.

10. The wireless communication unit of claim 8 wherein the multi-user detector is further configured to determine a remaining code capacity following selection of codes from the first set of codes.

11. The wireless communication unit of claim 10 wherein the multi-user detector is further configured to select a number of codes of the second set of codes corresponding to a remaining code capacity.

12. The wireless communication unit of claim 8 wherein the multi-user detector is further configured to determine an ordered list of codes in the second set of codes based on respective power measurements, and to select codes from the list in response to the respective power measurements.

13. The wireless communication unit of claim 12 wherein a respective power measurement comprises a measurement of power of a midamble signal.

14. The wireless communication unit of claim 12 wherein a respective power measurement comprises a measurement of power of a pilot signal.

15. The wireless communication unit of claim 8 wherein all codes of the first set of codes have a first priority and all codes of the second set of codes have a second priority.

16. The wireless communication unit of claim 1 adapted to operate in Universal Mobile Telecommunication System Terrestrial Radio Access (UTRA) system.

17. The wireless communication unit of claim 1 adapted to operate in 3.sup.rd Generation Partnership Project (3GPP) system.

18. The wireless communication unit of claim 1 adapted to operate in Time Division Duplex (TDD) system.

19. The wireless communication unit of claim 1 wherein the wireless communication unit is User equipment comprising the multi-user detector.

20. The wireless communication unit of claim 1 wherein the wireless communication unit is a base station comprising the multi-user detector.

21. A method of multi-user detection in a Code Division Multiple Access (CDMA) cellular communication system, the method comprising:
    estimating spare code resource available in a first cell of the system;
    selecting at least a second cell neighbouring the first cell;
    selecting from codes associated with the second cell at least one additional code;
    performing multi-user detection processing in the first cell with the at least one additional code;
    wherein selecting the codes associated with the second cell further comprising:
    treating codes associated with the first cell with a same priority as the at least one additional code associated with the second cell, and
    treating at least a first code associated with a first mobile station with a higher priority.

22. The method of claim 21 wherein performing multi-user detection comprises:
    treating codes associated with the first cell with higher priority than the at least one additional code associated with the second cell.

23. The method of claim 21 wherein selecting at least a second cell neighbouring the first cell comprises:
    receiving from a network instruction for selecting the at least a second cell neighbouring the first cell.

24. A method of multi-user detection in a Code Division Multiple Access (CDMA) cellular communication system, the method comprising:
    estimating spare code resource available in a first cell of the system;
    selecting at least a second cell neighbouring the first cell;
    selecting from codes associated with the second cell at least one additional code by:
        forming a first set of codes having higher priority and a second set of codes having lower priority,
        forming an ordered list of codes in the second set of codes based on respective power measurements, and
        selecting from the ordered list at least one code having a power measurement above a predetermined threshold;

performing multi-user detection processing in the first cell with the at least one additional code.

25. A wireless communication unit comprising a multi-user detector for use in a Code Division Multiple Access (CDMA) cellular communication system, the multi-user detector being configured to:
  estimate spare code resource available in a first cell of the CDMA cellular communication system;
  select at least a second cell neighbouring the first cell;
  select from codes associated with the second cell at least one additional code by:
    forming a first set of codes having higher priority and a second set of codes having lower priority,
    forming an ordered list of codes in the second set of codes based on respective power measurements, and
    selecting from the ordered list at least one code having a power measurement above a predetermined threshold; and
  perform multi-user detection processing in the first cell with the at least one additional code.

* * * * *